United States Patent [19]

Iwanaga

[11] 4,223,768
[45] Sep. 23, 1980

[54] PARKING MECHANISM IN AUTOMATIC TRANSMISSION

[75] Inventor: Kazuyoshi Iwanaga, Yokohama, Japan

[73] Assignee: Nissan Motor Company, Limited, Yokohama, Japan

[21] Appl. No.: 952,757

[22] Filed: Oct. 19, 1978

[30] Foreign Application Priority Data

Sep. 13, 1978 [JP] Japan .............................. 53-112644

[51] Int. Cl.³ ............................................ F16D 67/00
[52] U.S. Cl. .................................... 192/4 A; 188/69; 248/200
[58] Field of Search ................ 192/4 A, 4 R; 188/31, 188/69, 60; 248/200

[56] References Cited

U.S. PATENT DOCUMENTS

| | | | |
|---|---|---|---|
| 2,875,856 | 3/1959 | Mrlik et al. | 192/4 A |
| 3,386,532 | 6/1968 | Moss | 192/4 A |
| 3,539,039 | 11/1970 | Chana | 192/4 A |
| 3,601,230 | 8/1971 | Platz | 188/31 |
| 3,729,075 | 4/1973 | Piret | 192/4 A |

*Primary Examiner*—George H. Krizmanich
*Attorney, Agent, or Firm*—Thompson, Birch, Gauthier & Samuels

[57] ABSTRACT

In a parking mechanism of an automotive automatic transmission having a park gear, a parking pawl which can mesh with the park gear, a cam mounted on an actuator rod to change the position of the pawl and an actuator support fixed to the inside of a transmission case to slidably support the actuator rod, the actuator support is produced by press-forming of a sheet metal as a one-piece member whose middle portion is shaped so as to support and guide the actuator rod and the cam with the purpose of reducing production cost. The actuator support is easily fixed to the transmission case by forming two slits in the transmission case at the stage of casting the case and inserting two end portions of the actuator support respectively into these two slits each together with a leaf spring.

7 Claims, 5 Drawing Figures

PARKING MECHANISM IN AUTOMATIC TRANSMISSION

BACKGROUND OF THE INVENTION

This invention relates to a parking mechanism in an automotive automatic transmission.

Automotive automatic transmissions comprise a parking mechanism to positively lock the output shaft of the transmission to the transmission case when park position is selected. A parking mechanism includes a park gear formed on a member mounted on the output shaft, a spring-supported parking pawl which can mesh with the park gear, a cam mounted on an actuator rod to change the position of the parking pawl and an actuator support which is fixed to the inside of the transmission case to slidably support the actuator rod. In conventional parking mechanisms, the actuator support is either a member formed by forging and finished by machining or a member produced by sintering of an alloy powder. Naturally the production of the actuator support entails a considerable cost. For attachment of the actuator support to the transmission case, there is the need of machining the inside of the transmission case which is usually produced by casting. Besides, the installation of the actuator support to the transmission case requires a troublesome and time-consuming work utilizing fastening means such as bolts.

SUMMARY OF THE INVENTION

It is an object of the present invention to provide an improved parking mechanism in an automatic transmission for motor vehicles, which parking mechanism features a novel type of actuator support member which can be produced more easily and inexpensively than conventional actuator supports and can easily be attached to a cast transmission case without the need of machining the transmission case, so that the parking mechanism can be produced and assembled at reduced costs.

In an automatic transmission for a motor vehicle, a parking mechanism according to the invention has a park gear formed on a member fixedly mounted on an output shaft of the automatic transmission, a parking pawl which is pivotally mounted on a shaft fixed in a transmission case and can mesh with the park gear when park position of the automatic transmission is selected, an actuator support fixed to the inside of the transmission case, an actuator rod longitudinally movably supported by the actuator support and a cam mounted on the actuator rod so as to come into contact with the parking pawl thereby to change the position of the pawl when park position of the transmission is selected. Novel features of this parking mechanism reside in that the actuator support is a one-piece member formed by press-forming of a sheet metal and has a support portion which is a middle portion so shaped as to support the actuator rod and to allow the cam to enter therein and two anchor portions which are end portions distant from the support portion so as to be spaced from the actuator rod and the cam, that the transmission case is formed with two slits located and shaped such that the two anchor portions of the actuator support are respectively loosely received in the two slits and that the parking mechanism further comprises a resilient means in each of the aforementioned two slits for keeping each of the anchor portions of the actuator support motionless in each of the two slits.

Preferably, the transmission case is formed with an inward projection which is located and shaped such that the support portion of the actuator support rests on this projection. As a preferred example, the two anchor portions of the actuator support are made generally symmetrically distant from the support portions, i.e. a middle portion, and the actuator support is shaped so as to have two bridge or leg portions extending slantwise from the support portion respectively to the two anchor portions, and the inward projection of the transmission case takes the form of a cross-sectionally trapezoidal ridge such that the two leg portions of the actuator support extend respectively along the slant surfaces of this ridge while the support portion of the actuator support is located above the summit of this ridge.

The two slits in the transmission case, and also the inward projection, can be formed at the stage of casting the transmission case and do not need to be machined subsequently.

DESCRIPTION OF THE PREFERRED EMBODIMENTS

Figure 1:
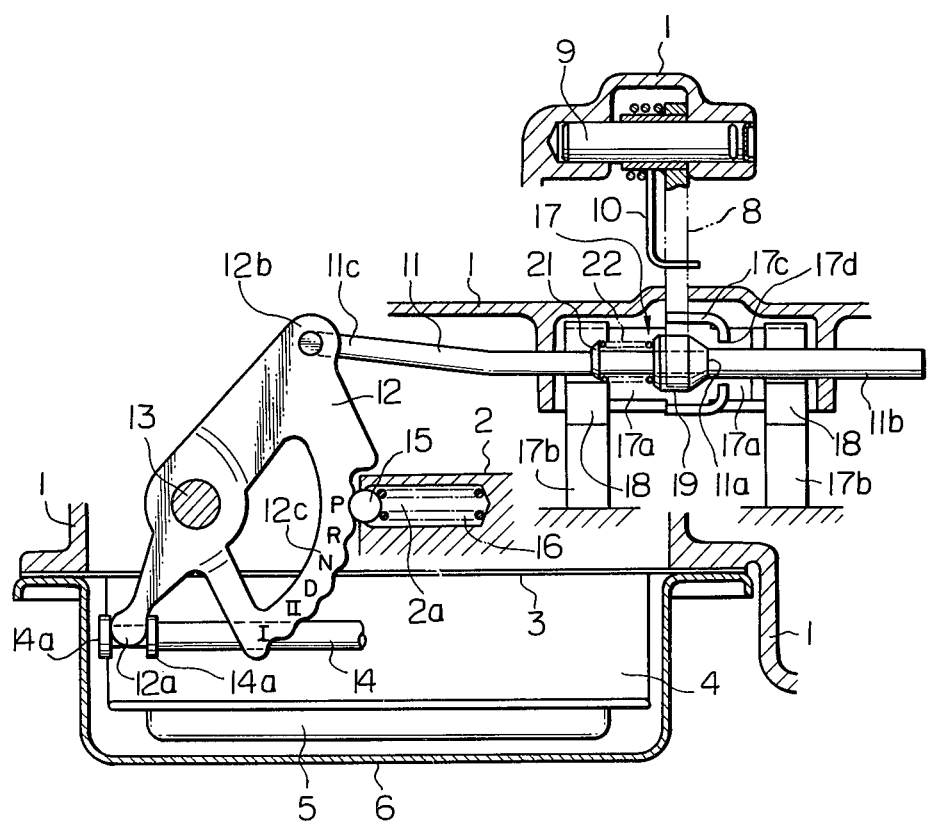
FIG. 1 shows a parking mechanims according to the invention in a front elevational view.
Figure 2:
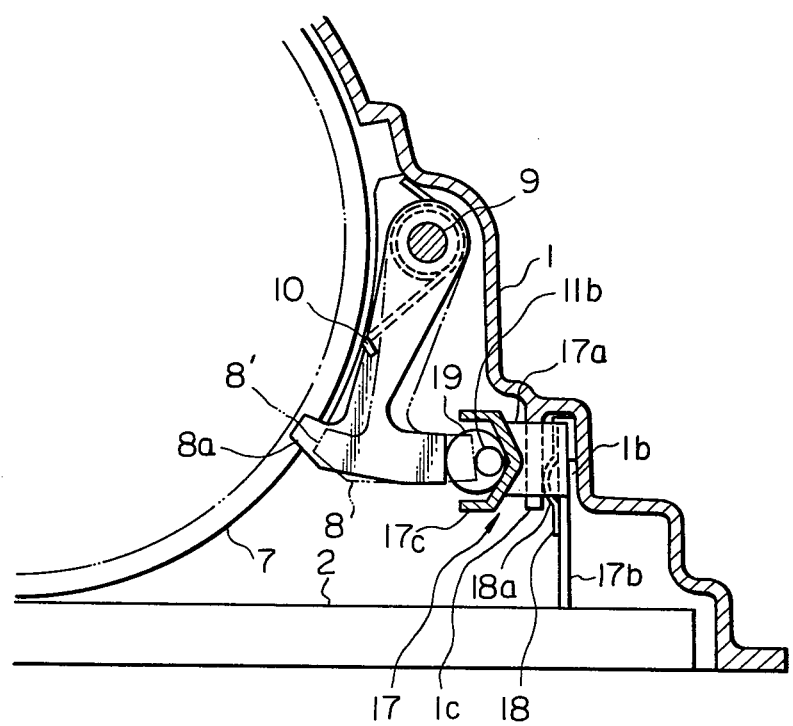
FIG. 2 shows the parking mechanism of FIG. 1 in a side elevational view.
Figure 3:
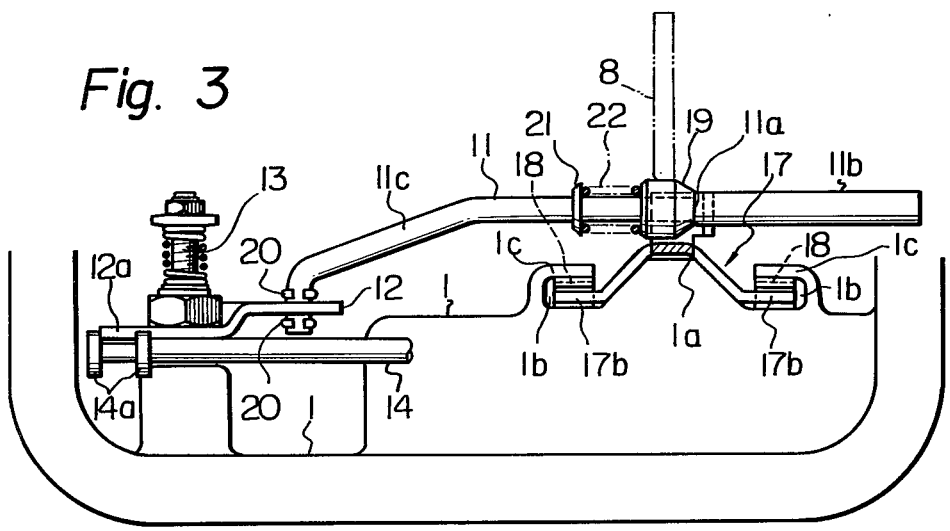
FIG. 3 shows the parking mechanims of FIG. 1 in a rear plan view.

FIGS. 1-3 illustrate an embodiment of the present invention. Reference numeral 1 indicates a transmission case of an automatic transmission in an automobile, assembled with an oil strainer 5 and an oil pan 6 with the interposal of a separate plate 3. In the usual manner an upper control valve body 2 and a lower control valve body 4 are installed in the transmission case 1.

A manual plate 12 is rotatably mounted on a shaft 13 which is fixed at its one end to the inside of the transmission case 1. At a projecting end portion 12a, the manual plate 12 is coupled with a manual rod 14, which is linked with a selector lever (not shown), by means of two flanges 14a provided to an end portion of this rod 14. At another end portion 12b, the manual plate 12 is linked with an actuator rod 11 by means of snap rings 20 as shown in FIG. 3. The manual plate 12 has a sectoral portion 12c, where the periphery of the plate 12 is formed with six grooves P, R, N, D, II, and I respectively corresponding to Park position, Reverse range, Neutral position, Drive range, Second range and First range of the automatic transmission. The upper control valve body 2 is formed with a bore 2a. A ball 15 received in this bore 2a engages with one of the aforementioned six grooves of the manual plate 12 and is pressed against the manual plate 12 by a spring 16 disposed in the bore 2a, so that the manual plate 12 can be kept in a selected one of the six positions.

The actuator rod 11 has a relatively thin (small diameter) portion 11c and a relatively thick (large diameter) portion 11b and is linked with the manual plate 12 at the end of the thinner portion 11c. The boundary between the thicker and thinner portions 11b and 11c provides a step 11a. A cam 19, which is generally cylindrical but has conical cam surfaces, is coaxially and slidably mounted on the thinner portion 11c of the actuator rod 11. A spring 22 and an annular retainer 21 are provided on the actuator rod 11 such that the cam 19 is urged into contact with the aforementioned step 11a of the rod 11. The diameter of the cam 19 becomes smallest at one end contacting the step 11a.

A park gear 7 shown in FIG. 2 is fixedly mounted on an output shaft (not shown) of the automatic transmission, and a parking pawl 8 having at its one end a tooth 8a shaped so as to mesh with the park gear 7 is rotatably mounted on a shaft 9 which is fixedly supported by the transmission case 1. A wire spring 10 wound around the shaft 9 is in contact at one end portion with the transmission case 1 and at the other end portion with the parking pawl 8 so as to bias the pawl 8 in the direction away from the park gear 7.

The actuator rod 11 is supported by an actuator support member 17 which is fixed to the inside of the transmission case 1. The thicker portion 11b of the actuator rod 11 extends through a guide slot 17d of the actuator support 17, so that the actuator rod 11 can be moved longitudinally either to the right or to the left as viewed in FIGS. 1 and 3.

The above described parking mechanism is characterized by the construction of the actuator support member 17 and the manner of fixing this member 17 to the transmission case 1. These points will hereinafter be described further in detail.

Figure 4:
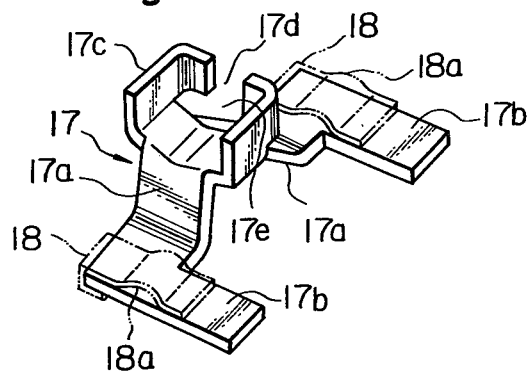
FIG. 4 is a perspective view of an actuator support member included in the parking mechanism of FIGS. 1-3.

As shown in FIG. 4, the actuator support 17 is a one-piece member produced by press-forming a sheet metal blank. A middle portion 17c of this actuator support 17 is shaped so as to provide a space 17e somewhat wider than the maximum diameter of the cam 19. Two symmetrical legs 17a extend slantwise from the middle or support portion 17c, and each of these legs 17a has a foot 17b (which will be referred to as anchor portion) in the shape of a flat and rectangular plate. A slot 17d is formed in a wall of the support portion 17c with such a width that the thicker portion 11b of the actuator rod 11 can slidably pass through this slot 17d. As a consequence, the rectangular anchor portions 17b extend parallel to each other in a plane distant from the boundaries between the support portion 17c and the two legs 17a. The distance between the two anchor portions 17b is greater than the length of the support portion 17c.

On the inside of the transmission case 1, two angled projections 1c are formed so as to provide two parallel slits 1b at a distance therebetween. These projections 1c are formed at the stage of producing the transmission case 1 by casting. The distance between the two slits 1b corresponds to the distance between the two anchor portions 17b of the actuator support 17, and each of the slits 1c is wide enough to loosely receive therein each of the anchor portions 17b of the actuator support 17.

As can be best seen in FIG. 3, the actuator support 17 is attached to the transmission case 1 by inserting the two flat anchor portions 17b respectively into the two slits 1b provided by the projections 1c of the transmission case 1. To prevent any movement of the actuator support 17 relative to the transmission case 1, the anchor portions 17b are inserted into the slits 1b each with the provision of a leaf spring 18 (shown in FIG. 4 by phantom line). In one end portion, the leaf spring 18 is hooked so as to enfold one end region of the rectangular anchor portion 17b. A middle portion 18a of this spring 18 is curved and outwardly bulged such that, in the slit 1b, the curved and bulged portion 18a is deformed by contact with the angled projection 1c so as to strongly press the anchor portion 17b of the actuator support 17 against the transmission case 1. As shown in FIG. 2, the anchor portions 17b of the actuator support 17 each have such a length that, when attached to the transmission case 1, each anchor portion 17b comes into contact with an outer surface of the upper control valve body 2 at its one end opposite to the end enfolded by the leaf spring 18.

Preferably, the transmission case 1 is formed with a cross-sectionally trapezoidal rib or ridge 1a between the two parallel slits 1b such that the support portion 17c of the actuator support 17 is located above the first summit of this ridge 1a while the two legs 17a of the actuator support 17 extend along the slant side faces of the ridge 1a. This ridge 1a, too, is formed at the stage of casting the transmission case 1.

The locations of the slits 1b and the dimensions of the actuator support 17 are made such that the cam 9 can enter the space 17e in the support portion 17c while the thicker portion 11b of the actuator rod 11 is guided by the slot 17d.

Unless Park position of the automatic transmission is selected, the manual plate 12 takes a position where the ball 15 is in engagement with one of the five grooves R, N, D, II and I of the manual plate 12. In this state, the actuator rod 11 is displaced leftward from the position shown in FIGS. 1 and 3, so that the cam 19 remains out of the support portion 17c of the actuator support 17, meaning that the thicker portion 11b of the actuator rod 11 passes through the entire length of the space 17e in the support portion 17c. The parking pawl 8, therefore, does not come into contact with the cam 19 but is forced to come into contact with the thicker portion 11b of the actuator rod 11 by the spring 10 so as to take a position 8' shown in FIG. 2 by phantom line, whereby the output shaft of the automatic transmission can be rotated.

When Park position is selected, the manual plate 12 takes the position shown in FIGS. 1 and 2, where the ball 15 engages with the groove P. In this state the cam 19 is positioned in the space 17e in the support portion 17c of the actuator support 17 and hence comes into contact with the parking pawl 8. Accordingly the pawl 8 is pressed against the parking gear 7, overcoming the force of the spring 10. When the pawl 8 meshes with the park gear 7, the output shaft of the automatic transmission is prevented from rotating.

In cases where the pawl 8 does not mesh with the park gear 7 but comes into abutment with a tooth of the gear 7 in response to the selection of Park position, the cam 19 makes a slight displacement to the left in FIGS. 1 and 3 to compress the spring 22 and to give a gap between the righthand end of the cam 19 and the step 11a of the actuator rod 11, resulting in that the pawl 8 is strongly biased towards the park gear 7 by the spring force transmitted by the cam 19. When the car makes a slight rolling and hence the park gear 7 makes a slight rotation in this state, the cam 19 reaches the position shown in FIGS. 1 and 3 (the righthand side end of the cam 19 comes into contact with the step 11a) and the pawl 8 meshes with the park gear 7, whereby the output shaft of the transmission is firmly locked and hence the car can no longer move in either direction.

Figure 5:
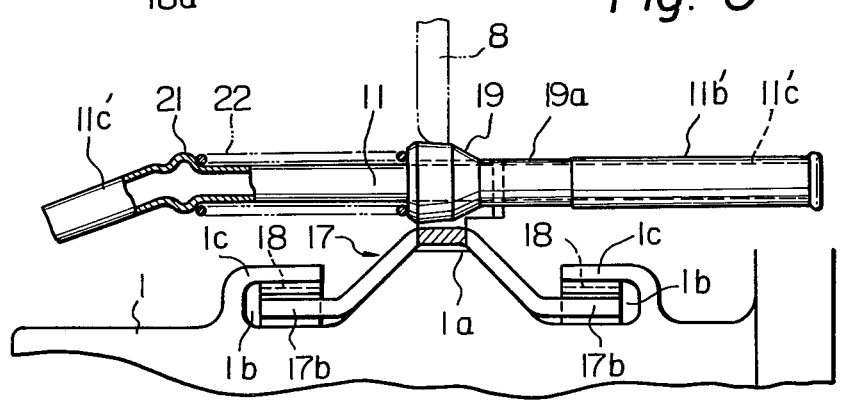
FIG. 5 shows a partial modification of the parking mechanism of FIGS. 1-3.

As shown in FIG. 5, the actuator rod 11 may take the form of an assembly of two tubes different in diameter:

a tube 11b' relatively large in diameter and another tube 11c' which is to be linked with the manual plate 12 and has an outer diameter fitted to the inner diameter of the thickner tube 11b'. An end portion of the thinner tube 11c' passes through the entire length of the thicker tube 11b' so that the free end of the thinner (inner) tube 11c' protrudes from the righthand end of the thicker (outer) tube 11b'. After the spring 22 and the cam 19 are fitted around the thinner tube 11c', the protruded end of the thinner tube 11c' is crimped over the entire circumference so that the outer tube 11b' is fixed to the inner tube 11c'. In this case, the retainer 21 for the spring 22 can be formed by flanging or bulging the thinner tube 11c' at an appropriate section so as to provide either an annular brim or a plurality of small knot-like projections at suitable circumferential intervals. The righthand end of the cam 19 is in contact with the lefthand end of the outer tube 11b' when the cam 19 takes the extreme righthand position.

Also as illustrated in FIG. 5, the cam 19 may have a considerably long cylindrical portion 19a, which is approximately equal in outer diameter to the tube 11b', as its one end portion adjacent the thick portion 11b' (or 11b) of the actuator rod 11 to ensure that the parking pawl 8 remains in contact with the cam 19 even when the cam 19 moves towards the retainer 21.

Since an actuator support according to the invention as exemplified by the illustrated one 17 is a one-piece member produced by press-forming of a sheet metal, this actuator support can be produced easily and inexpensively than conventional actuator supports produced either by machining a forged material or by sintering of an alloy powder. As an additional advantage of an actuator support according to the invention, it can be made lighter in weight than any of conventional actuator supports. The projections 1c which provide the slits 1b in the transmission case 1 can be easily formed at casting of the case 1 and serve their role in the as-cast state (with no need for machining) since the anchor portions 17b of the actuator support 17 are designed so as to loosely fit into the slits 1b (fixing of the actuator support 17 to the case 1 is accomplished by means of the leaf spring 18) and accordingly a relatively large tolerance is allowable to the slits 1b or projections 1c. Also it is not the least objectionable to leave the cross-sectionally trapezoidal ridge 1a in the as-cast state. Furthermore, the attachment of the actuator support 17 to the transmission case 1, too, becomes quite easy. Thus the invention brings about considerable reduction of total costs of the parking mechanism and hence is industrially of great value.

What is claimed is:

1. In a parking mechanism of an automatic transmission for a motor vehicle, the parking mechanism having a park gear fixed relative to an output shaft of the automatic transmission for rotation therewith, a parking pawl which is pivotally mounted for movement between an inoperative position spaced from the park gear and an operative position in mesh with the park gear when park position of the automatic transmission is selected, an actuator support fixed in relation to the transmission case, an actuator rod longitudinally movably supported by the actuator support and a cam mounted on the actuator rod, the cam being positioned to urge said parking pawl from said inoperative position to said operative position when the park position of the automatic transmission is selected, the improvement comprising said actuator support being a one-piece member formed by press-forming a sheet metal blank and having a support portion which is shaped to support said actuator rod and to receive said cam, and two anchor portions which have end portions arranged relative to said support portion so as to be spaced from said actuator rod and said cam, said transmission case being formed with two slits located and shaped to receive said two anchor portions in interlocked engagement therein.

2. A parking mechanism as claimed in claim 1, wherein said transmission case is formed with an inward projection located and shaped such that said support portion of said actuator support rests on said projection.

3. A parking mechanism as claimed in claim 2, wherein said two anchor portions of said actuator support are generally symmetrically distant from said support portion, said actuator support having two leg portions extending slantwise from said support portion respectively to said two anchor portions, said inward projection of said transmission case being in the form of a cross-sectionally trapezoidal ridge such that said two leg portions of said actuator support extend respectively along two slant surfaces of said ridge while said support portion is located above the summit of said ridge.

4. A parking mechanism as claimed in claim 1, wherein said resilient means comprise leaf springs.

5. A parking transmission as claimed in claim 1 further comprising resilient means in said slits for resisting movement of said anchor portions relative to said casing.

6. A parking transmission as claimed in claim 5 wherein said resilient means comprises spring clips enveloping the ends of said anchor portions and insertable with said anchor portions into said slits.

7. A parking mechanism as claimed in claim 5 wherein said support portion is located centrally with respect to said anchor portions.

* * * * *